United States Patent [19]
Hasegawa et al.

[11] Patent Number: 4,681,492
[45] Date of Patent: Jul. 21, 1987

[54] HIGH-SPEED SPINDLE

[75] Inventors: Junzo Hasegawa; Susumu Kawabata; Nobuharu Mimura, all of Aichi, Japan

[73] Assignee: Kabushiki Kaisha Toyota Chuo Kenkyusho, Aichi, Japan

[21] Appl. No.: 843,759

[22] Filed: Mar. 25, 1986

[30] Foreign Application Priority Data

Apr. 2, 1985 [JP] Japan .................. 60-69581

[51] Int. Cl.$^4$ ............................................. B23Q 1/08
[52] U.S. Cl. ........................................ 409/231; 82/30; 384/222; 408/126
[58] Field of Search ............... 408/126, 128, 68; 409/231, 232, 233, 239; 82/28 R, 30; 51/168, 169; 384/99, 222

[56] References Cited

U.S. PATENT DOCUMENTS

| | | | |
|---|---|---|---|
| 2,961,899 | 11/1960 | Grove et al. | 408/126 X |
| 3,101,979 | 8/1963 | Mard | 384/99 |
| 3,134,275 | 5/1964 | Davison | 408/126 X |
| 3,163,190 | 12/1964 | Ervin | 408/68 X |
| 3,183,730 | 5/1965 | Scragg et al. | 408/126 X |
| 3,382,017 | 5/1968 | Cripe | 384/222 X |
| 3,385,009 | 5/1968 | Lueders | 51/168 |
| 4,082,475 | 4/1978 | Kuder | 408/126 X |
| 4,128,278 | 12/1978 | Headen et al. | 384/222 X |
| 4,222,692 | 9/1980 | Pavlovsky | 409/231 X |
| 4,380,991 | 4/1983 | Richter et al. | 408/126 X |

Primary Examiner—Gil Weidenfeld
Assistant Examiner—Glenn L. Webb
Attorney, Agent, or Firm—Oblon, Fisher, Spivak, McClelland & Maier

[57] ABSTRACT

A spindle apparatus is composed of a holding member to define a casing, a spindle shaft to support a rotor rotatably, a neck bearing disposed radially of the spindle shaft, a buffer disposed between the holding member and the neck bearing, an end bearing secured to the end of the holding member remote from the rotor, and a mechanism provided between the buffer and the end bearing for transmitting power from a source of power to the spindle shaft for rotating the shaft. This spindle, rotatable at a high speed without any substantial vibration or noise, is applicable to spinning machines, more particularly to an overhung rotor.

31 Claims, 11 Drawing Figures

HIGH-SPEED SPINDLE

BACKGROUND OF THE INVENTION

1. Field of the Invention

This invention relates to a spindle apparatus which is particularly suitable for rotating an overhung rotor at high speed, as in a device for rotating a cutting or grinding tool at high speed, a ring spinning machine, a spinning machine, a rotor type open-end spinning machine, or a rotating spraying type coating apparatus having a bell- or disk-shaped spraying head which is rotatable at high speed. More particularly, this invention relates to a high-speed spindle having a spindle shaft which is rotatable at a high speed in a neck bearing disposed elastically in a stationary holding member and an end bearing secured thereto.

2. Description of the Prior Art

Referring by way of example to a textile machine, there is known a spindle including a casing, a neck bearing secured to the casing, an end bearing attached to the casing by a buffer, and a spindle shaft supported rotatably by the neck and end bearings and adapted to be driven by a belt extending about a pulley provided substantially at the same position as the neck bearing, as shown in, for example, Japanese Laid-Open Patent Specification No. 11914/1972 or 1230/1973. The buffer is effective for preventing vibration of the shaft and its generation of noise as long as the spindle is driven at a rotating speed up to, say, 1000 rpm. It is, however, not effective at all if the spindle is driven at a speed of, or above, say, 15,000 rpm. The vibration of the shaft and the noise thereby produced make the rotation of the spindle virtually impossible at such a high speed.

Another known apparatus is a modification to the spindle hereinabove described and has a buffer provided between the neck bearing and the casing, too, in order to overcome the drawback which has hereinabove been pointed out. This buffer is, however, not effective, either, to ensure any stable rotation of the spindle shaft at such a high speed as hereinabove mentioned, since the tension which is exerted on the neck bearing by the driving belt limits the movement of the shaft. Moreover, as the buffer and the driving pulley are both provided at the neck bearing, the apparatus has the disadvantage of requiring a larger pulley diameter to enable the location of the buffer and, therefore, a higher belt speed to maintain the same rotating speed of the spindle shaft. This undesirably brings about an increase in power consumption and a greater degree of vibration.

Referring to a tool rotating apparatus or a rotating spraying type coating apparatus, it has been conventional to employ a spindle shaft having a sufficiently large diameter to enable its critical rotating speed to exceed the working speed of the apparatus in order to realize a high speed of rotation, therefore, it has been possible to solve the problem of vibration. The spindle shaft, however, requires a bearing having a correspondingly larger outside diameter and the heat of friction generated by the bearing limits the possibility of increasing the rotating speed of the shaft. There is, therefore, known an apparatus which includes a device for the forced feed lubrication of the bearing, or an apparatus in which an air bearing is used. These apparatuses are, however, expensive and consume a larger amount of power.

SUMMARY OF THE INVENTION

It is an object of this invention to overcome the drawbacks of the prior art as hereinabove pointed out and provide an improved spindle apparatus which is inexpensive and rotatable at a high speed without giving rise to any problem of vibration or noise and without consuming any unreasonably large amount of power.

The inventors of this invention have studied experimentally and calculated the vibration of the rotating spindle shafts supported in a variety of ways. As a result, they have found that the buffer disposed between the neck bearing and the casing can most effectively absorb the vibration of the spindle shaft, while the buffer provided at the end bearing as known in the art is hardly effective.

According to this invention, there is provided a high-speed spindle comprising: a holding member defining a casing; a spindle shaft adapted to support a rotor rotatably; a neck bearing provided radially of the spindle shaft between the opposite ends thereof for supporting it rotatably; a buffer disposed radially symmetrically between the holding member and the neck bearing; an end bearing secured to the end of the holding member remote from the rotor for supporting rotatably the end of the spindle shaft remote from the rotor; and means provided between the buffer and the end bearing for transmitting power from a source of power to the spindle shaft.

The rotor may, for example, be a spinning bobbin in a ring spinning machine or a spinning machine.

The buffer may, for example, comprise an elastic body having one or more small empty spaces which are radially spaced apart from one another, and which are filled with oil. The buffer may be formed from a viscoelastic material, such as rubber, plastics or a metal having a high damping power.

The spindle of this invention may further include a friction gearing which comprises an outer ring surrounding the spindle shaft and adapted for rotation with the power transmitting means, a plurality of elastic planetary friction wheels disposed between the outer ring and the spindle shaft and a stationary support ring for supporting the friction wheels rotatably.

The friction gearing may alternatively comprise an outer ring secured to the holding member, a plurality of elastic planetary friction wheels disposed between the outer ring and the spindle shaft for rotation in contact therewith, and a ring supporting the friction wheels for rotation therewith about the spindle shaft, the supporting ring being rotatable with the power transmitting means.

According to this invention, the end bearing is secured to the casing, the radially symmetric buffer is disposed between the casing and the neck bearing and the means for transmitting power to the spindle shaft is provided adjacent to the end bearing, as hereinabove set forth. Therefore, virtually no vibration is transmitted from the power transmitting means, such as a belt, to the spindle shaft. As no restrictive force is exerted on the neck bearing by the belt, the buffer surrounding the neck bearing works effectively to absorb any vibration that is produced by the rotor supported in an overhanging fashion at one end of the spindle shaft. The spindle of this invention can realize a high speed of rotation without producing any substantial vibration. The rigidity and damping power of the neck bearing can be appropriately selected to damp any detrimental vibration effectively when the spindle is driven at a critical speed.

DESCRIPTION OF THE PREFERRED EMBODIMENTS

Figure 1:
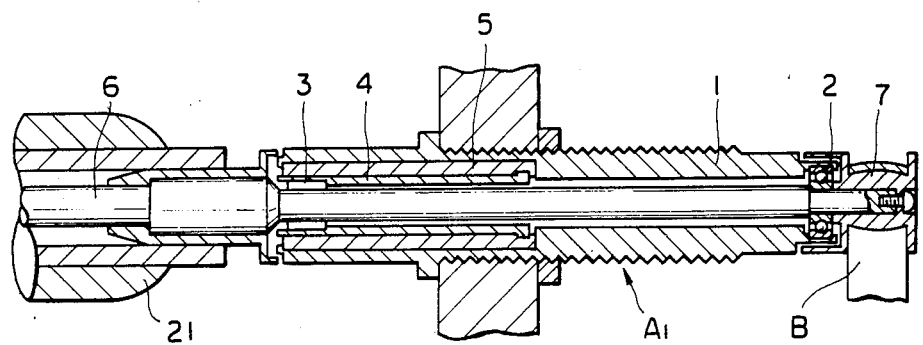
FIG. 1 is a longitudinal sectional view of a spindle for a textile machine according to a first embodiment of this invention.

The invention will now be described in further detail with reference to several embodiments thereof which are shown in the drawings.

First Embodiment (FIG. 1):

The high-speed spindle $A_1$ shown in FIG. 1 is used for a textile machine, such as a ring spinning machine or a spinning machine. It includes a stationary holding member, or bolster 1. An end bearing 2 is secured to one end of the bolster 1. A neck bearing comprises a bearing body 3 and a tubular sleeve 4 having one end in which the bearing body 3 is fitted. A buffer 5 is disposed between the bolster 1 and the sleeve 4. The buffer 5 is formed from an appropriate viscoelastic material, such as rubber, plastics, or a metal having a high damping power. A spindle shaft 6 is rotatably supported by the neck bearing 3 substantially in its mid-portion and by the end bearing 2 adjacent to its lower end. A spinning bobbin 21 is rotatably supported on the spindle shaft 6 at its end remote from the end bearing 2. A flat belt B and a pulley 7 are connected to the lower end of the spindle shaft 6 for transmitting power from a source of power (not shown) to the spindle shaft 6.

Figure 2:
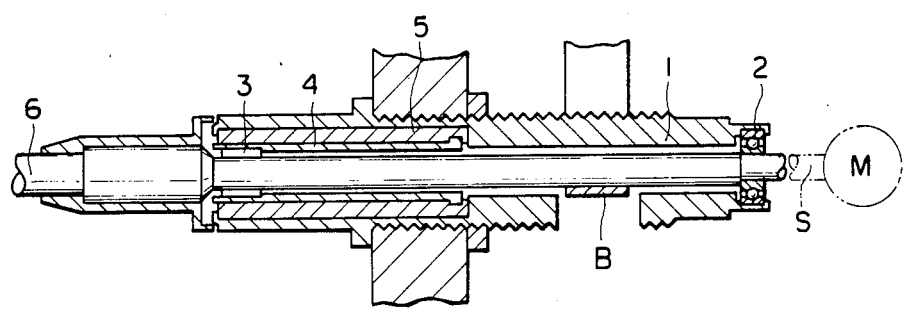
FIG. 2 is a longitudinal sectional view of a modified form of the spindle shown in FIG. 1.

A modified form of the spindle is shown in FIG. 2. It is characterized by the flat belt B which is connected to the spindle shaft 6 intermediate the ends thereof. This modified construction has the advantage that the neck and end bearings have a prolonged life, since the load of the belt B is distributed between the two bearings.

Referring again to FIG. 2, another modified form of the spindle is characterized by not including any belt, but including a motor M having an output shaft S connected directly to the end of the spindle shaft 6, as shown by broken lines. This arrangement has the advantage that each of the bearings has a still improved life, since no belt exerts any load thereon. Another advantage thereof is that the spindle is free from any problem of vibration or noise that would occur if it includes a belt.

The spindle shown in FIG. 1 and its modifications shown in FIG. 2 are all reliably rotatable at a high speed, since the neck bearing 3 supported by the buffer 5 is movable to absorb any vibration effectively.

Figure 3:
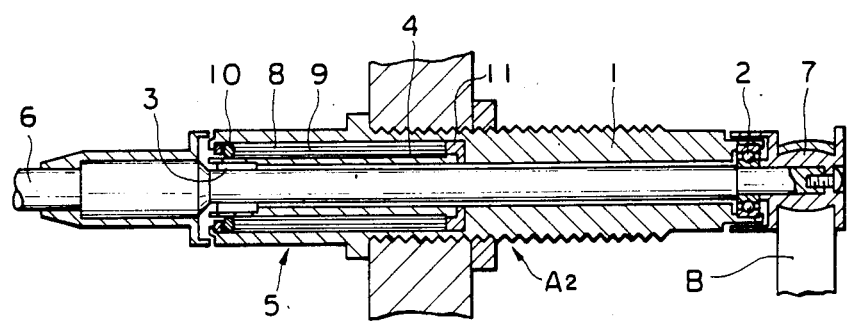
FIG. 3 is a longitudinal sectional view of a spindle for a textile machine according to a second embodiment of this invention.

Second Embodiment (FIG. 3):

The spindle $A_2$ shown in FIG. 3 is an improved form of the spindle shown in FIG. 1. Its improvement resides in a buffer 5 comprising an elastic body 8 of low rigidity having a plurality of small empty spaces which are filled with oil 9. Sealing members 10 and 11 are provided at the opposite ends, respectively, of the tubular sleeve 4 for preventing the leakage of the oil 9. In any other respect, the spindle $A_2$ is identical to the spindle $A_1$ of FIG. 1. No repeated description is made of their common parts which are shown by the same numerals in both of FIGS. 1 and 3. The buffer 5 shown in FIG. 3 has a higher power of absorbing vibration. Therefore, it enables the still more reliable rotation of the spindle $A_2$ at a high speed. Moreover, it enables a reduction in the load acting on the bearings and thereby a substantial prolongation of their life.

Figure 4:
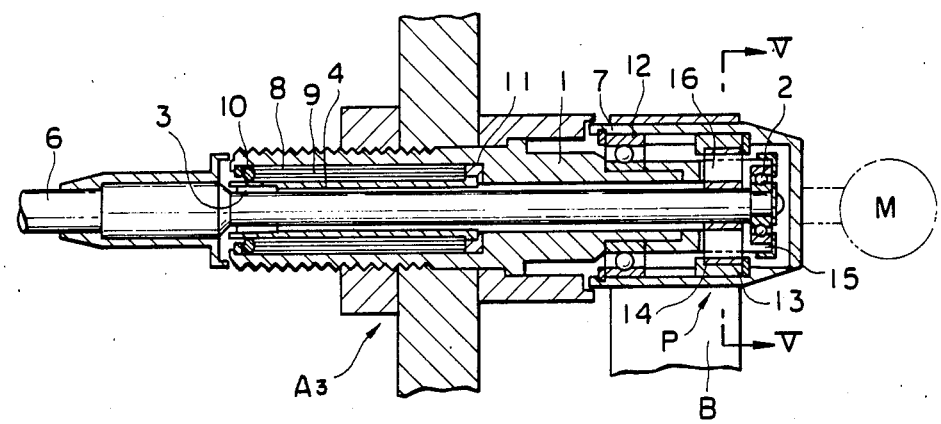
FIG. 4 is a longitudinal sectional view of a spindle for a textile machine according to a third embodiment of this invention.
Figure 5:
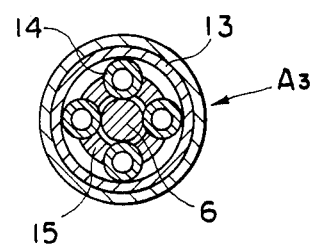
FIG. 5 is a sectional view taken along the line V—V of FIG. 4.

Third Embodiment (FIGS. 4 and 5):

The spindle $A_3$ shown in FIGS. 4 and 5 is characterized by including a friction gearing which comprises a planetary friction speed multiplying mechanism P disposed between the spindle shaft 6 and the pulley 7. The planetary friction mechanism P includes a support ring 15 secured to the lower end of the bolster 1 and having a plurality of recesses 16, and a plurality of hollow cylindrical planetary friction wheels 14 each disposed rotatably in one of the recesses 16. The mechanism P also includes an outer ring 13 surrounding and contacting the friction wheels 14. The outer ring 13 is press fitted in the pulley 7. The outer ring 13 is, therefore, rotatable with the pulley 7. The lower end of the spindle shaft 6 is surrounded and contacted by the friction wheels 14. The mechanism P increases the rotation of the pulley 7 and transmits it to the spindle shaft 6. In any other respect, the spindle $A_3$ is substantially identical to the spindle $A_2$ of FIG. 3. No further description thereof is, therefore, made.

Insofar as the pulley 7 is separated from the spindle shaft 6, no vibration of the belt B is directly transmitted to the spindle shaft 6. Therefore, the spindle $A_3$ is more reliably rotatable at a high speed and has a substantially prolonged bearing life. The planetary friction mechanism P enables the spindle $A_3$ to rotate at the same speed as any other spindle hereinabove described, even if the belt may be moved at a lower speed, and thereby a reduction in the vibration and noise produced by the belt and any other parts associated therewith.

Figure 6:
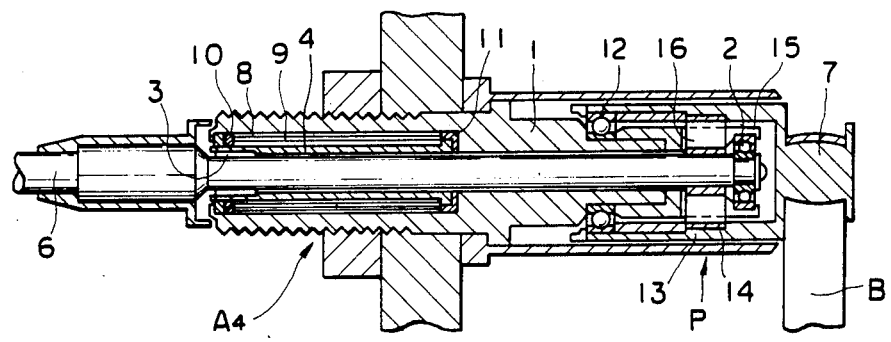
FIGS. 6 to 8 are longitudinal sectional views of spindles according to fourth to sixth embodiments, respectively, of this invention.

Fourth Embodiment (FIG. 6):

The spindle $A_4$ of FIG. 6 is similar to the spindle $A_3$ of FIG. 4, but differs therefrom in the construction of the pulley 7. In the spindle $A_3$, the belt B contacts the pulley in its portion surrounding the outer ring 13, but the pulley 7 in FIG. 6 includes a downwardly projecting extension which is located beyond the end bearing 2, and which the belt B contacts. In any other respect, the spindle $A_4$ is substantially identical to the spindle $A_3$. No further description thereof is therefore made.

The diameter of that portion of the pulley 7 in the spindle $A_4$ about which the belt B extends can be selected as desired. Therefore, it is possible to employ a still lower belt speed and thereby reduce the vibration and noise of the belt and any other parts associated therewith to a greater extent.

Figure 7:
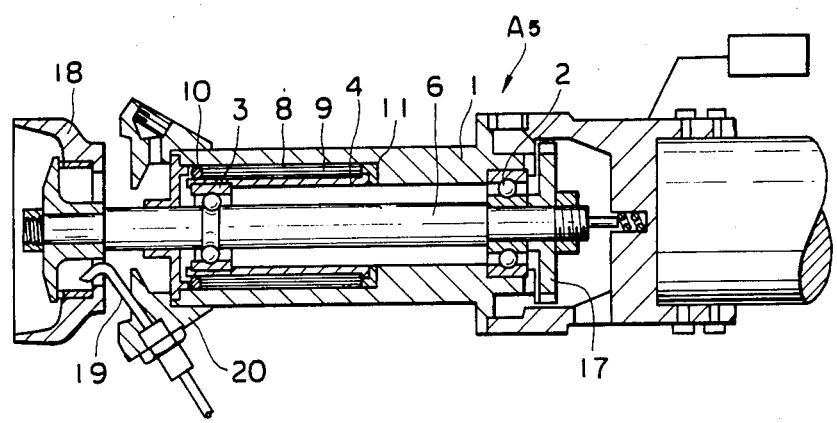

Fifth Embodiment (FIG. 7):

The spindle $A_5$ of FIG. 7 includes a spindle shaft 6 supported rotatably by a neck bearing 3 and an end bearing 2 in a housing 1 for a rotating spraying type coating apparatus. The shaft 6 has one end to which a bell-shaped spraying head 18 is secured. A paint nozzle 19 is connected to the spraying head 18. An air turbine 17 is connected to the other end of the shaft 6 for driving it. In any other respect, the spindle $A_5$ is substantially identical to the spindle shown in FIGS. 3, 4 or 6. No further description thereof is, therefore, made.

The spindle $A_5$ is comparable to any of the various forms of spindles hereinabove described and rotatable at a high speed without producing any substantial vibration. It promotes the spraying of paint particles and enables a higher degree of uniformity in coating than can be obtained by any similar apparatus known in the art.

Figure 8:
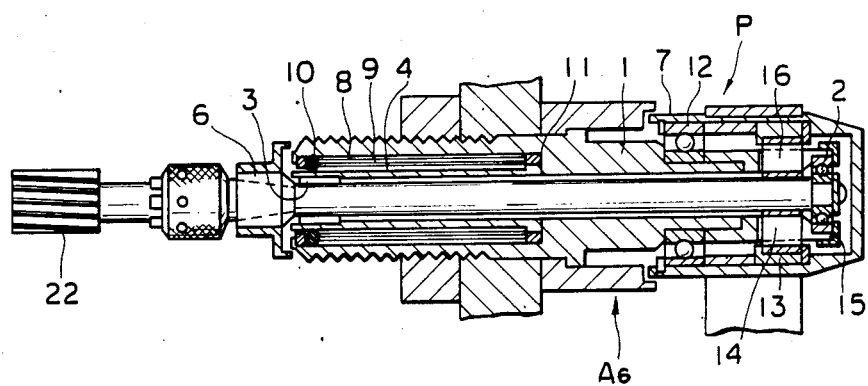

Sixth Embodiment (FIG. 8):

The spindle $A_6$ of FIG. 8 includes a spindle shaft 6 to which a milling cutter 22 is connected, and which is provided with a planetary friction mechanism P which increases the rotation of the shaft 6 by several times and transmits it to the cutter 22, so that the efficiency and accuracy of the milling work may be improved. In any other respect, the spindle $A_6$ is substantially identical to the spindle shown in FIG. 4. No further description thereof is, therefore, made.

The spindle $A_6$ is comparable to any of the various forms of spindles hereinabove described, and rotatable at a high speed without producing any appreciable vibration. It provides a high milling speed and a high accuracy of surface finish.

Figure 10:
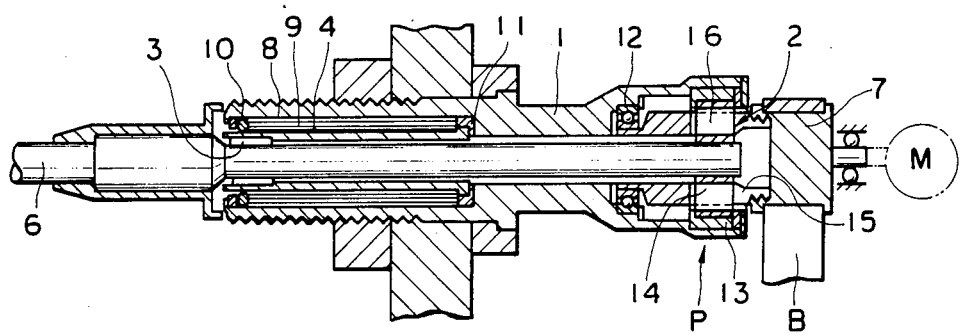
FIGS. 10 and 11 are longitudinal sectional views of other embodiments of this invention.
Figure 11:
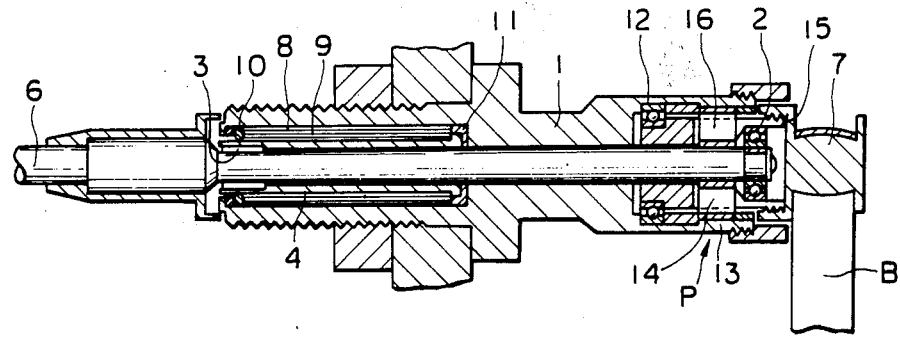

The support ring 15 of the planetary friction mechanism P in the spindle $A_3$ of FIG. 4 is stationary and its outer ring 13 is rotatable. The same is true of the planetary friction mechanism P in the spindle $A_4$ of FIG. 6. FIGS. 4 and 6 do, however, not limit the construction of the planetary friction mechanism P which is applicable to the spindle of this invention. It is alternatively possible to employ a support ring 15 which is rotatable with the planetary friction wheels 14, and an outer ring 13 which is fixedly connected to the bolster 1, as shown by way of example in FIGS. 10 and 11. The spindle of FIG. 10 has an end bearing 2 which is constituted by the friction wheels 14 in the planetary friction mechanism P. It is comparable in performance to any of the various forms of spindles hereinabove described. The belt B in FIG. 10, as well as in FIG. 4, can be replaced by a motor M connected directly to the end of the outer ring 13 or the support-ring 15, as shown by broken lines.

In all of the spindles hereinabove described, the buffer 5 and the pulley 7 are so positioned as to absorb any vibration most effectively. This enables not only the reliable rotation of the spindle shaft at a high speed of at least 20,000 rpm, but also a reduction in the load acting on the bearings and thereby a substantial prolongation of their life.

Figure 9:
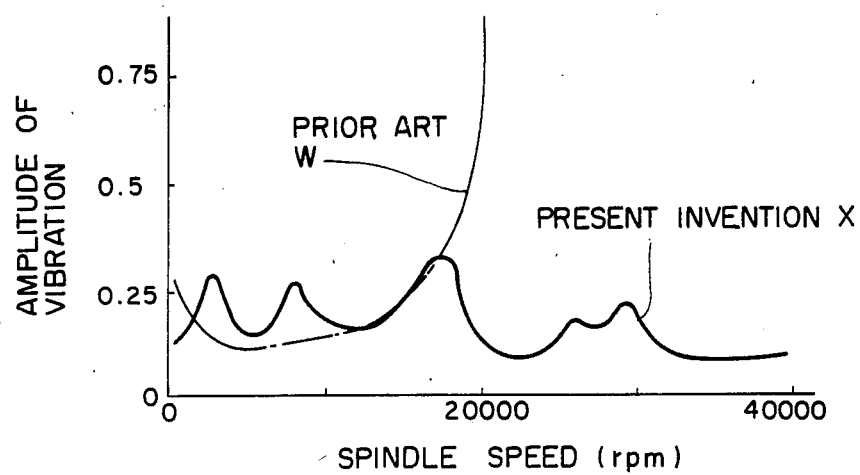
FIG. 9 is a graph comparing the vibration of the end of a full bobbin supported on the spindle of this invention with the vibration of the end of a full bobbin supported on a conventional spindle.

The inventors of this invention have ascertained the advantages of the spindle according to this invention by conducting a vibration test. They employed the spindle according to the first embodiment of this invention and a conventionally known spindle for a ring spinning machine including a buffer disposed at an end bearing and measured the vibration of the end of a full spinning bobbin attached to the shaft of each spindle at various rotational speeds of the shaft. The results are shown in FIG. 9. In FIG. 9, curve X shows the vibration of the bobbin attached to the spindle according to this invention, while curve W shows the results obtained by employing the known spindle. As is obvious therefrom, the vibration of the bobbin attached to the known spindle showed a sharp increase at a rotating speed in the vicinity of 20,000 rpm, and the spindle could no longer be driven in a stable manner. On the other hand, the spindle of this invention was found to be capable of absorbing vibration effectively even at a rotating speed exceeding 20,000 rpm and reliably rotatable even at a speed of 40,000 rpm.

Obviously, numerous modifications and variations of the present invention are possible in light of the above teachings. It is therefore to be understood that within the scope of the appended claims, the invention may be practiced otherwise than as specifically described herein.

I claim:

1. A high-speed spindle which is rotatable at high speed without producing any substantial vibration or noise, said spindle comprising:

a holding member defining a casing;

a spindle shaft adapted to support a rotor rotatably;

a neck bearing disposed radially of said spindle shaft for supporting said spindle shaft rotatably, said bearing being located between one end of said spindle shaft on which said rotor is supported and the other end thereof;

damping means including a damping sleeve disposed radially symmetrically between said holding member and said neck bearing and said spindle shaft, said damping sleeve being secured to said neck bearing at one end thereof and being longer than said neck bearing, and a buffer disposed radially symmetrically between said damping sleeve and said holding member;

an end bearing secured to the end of said holding member remote from said rotor for supporting said spindle shaft at said other end thereof; and means for transmitting power from a source of power to said spindle shaft, provided on said end bearing side of said damping means.

2. A spindle as set forth in claim 1, wherein said means for transmitting power comprises a pulley connected directly to said spindle shaft and a flat belt for transmitting said power to said pulley.

3. A spindle as set forth in claim 2, wherein said pulley is connected to said other end of said spindle shaft.

4. A spindle as set forth in claim 2, wherein said pulley is located between said buffer and said end bearing.

5. A spindle as set forth in claim 1, wherein said source of power is a motor and said means for transmitting power is a rotary shaft embedded in, or connected directly to, said motor and connecting said motor to said spindle shaft.

6. A spindle as set forth in claim 1, wherein said buffer is formed from a viscoelastic material selected from rubber, plastics and a metal having a high damping power.

7. A spindle as set forth in claim 1, wherein said buffer comprises an elastic body having one or more small empty spaces which are radially spaced apart from one another, and which are filled with oil.

8. A spindle as set forth in claim 1, further including a friction gearing which comprises an outer ring, a plurality of elastic planetary friction wheels disposed between said outer ring and said spindle shaft and adapted for rotation in contact with said outer ring and said spindle shaft, and a support ring for supporting said friction wheels rotatably.

9. A spindle as set forth in claim 8, wherein said power transmitting means comprises a pulley for transmitting said power from said source of power to said spindle shaft through said friction gearing, and a flat belt for transmitting said power from said source of power to said pulley.

10. A spindle as set forth in claim 9, wherein said pulley is disposed at said other end of said spindle shaft.

11. A spindle as set forth in claim 9, wherein said pulley is located between said buffer and said end bearing.

12. A spindle as set forth in claim 8, wherein said source of power is a motor and said power transmitting means is a rotary shaft embedded in, or connected directly to, said motor, said power being transmitted from said source of power to said spindle shaft through said rotary shaft and said friction gearing.

13. A spindle as set forth in claim 8, wherein said buffer is formed from a viscoelastic material selected from rubber, plastics and a metal having a high damping power.

14. A spindle as set forth in claim 8, wherein said buffer comprises an elastic body having one or more small empty spaces which are radially spaced apart from one another, and which are filled with oil.

15. A spindle as set forth in claim 8, wherein said outer ring is rotatable with said power transmitting means, while said support ring is secured to said friction wheels being rotatable for transmitting said power to said spindle shaft by friction.

16. A spindle as set forth in claim 8, wherein said support ring is rotatable with said power transmitting means for revolution about said spindle shaft with said friction wheels, while said outer ring is secured to said holding member.

17. A spindle as set forth in claim 1, wherein said rotor is a spinning bobbin which is rotatably connected to said one end of said spindle shaft.

18. A spindle as set forth in claim 17, wherein said spindle shaft is rotatably supported by said neck bearing approximately intermediate said ends thereof, said power transmitting means comprises a pulley connected directly to said spindle shaft at said other end thereof and a flat belt for transmitting said power from said source of power to said pulley, and said buffer is formed from an appropriviscoelastic material having a high damping power.

19. A spindle as set forth in claim 17, wherein said spindle shaft is rotatably supported by said neck bearing approximately intermediate said ends thereof, said power transmitting means comprises a pulley connected directly to said spindle shaft between said buffer and said end bearing and a flat belt for transmitting said power from said source of power to said pulley, and said buffer is formed from a viscoelastic material having a high damping power.

20. A spindle as set forth in claim 17, wherein said spindle shaft is rotatably supported by said neck bearing approximately intermediate said ends thereof, said source of power is a motor, said power transmitting means is a rotary shaft embedded in, or connected directly to, said motor and connecting said motor to said spindle shaft, and said buffer is formed from a viscoelastic material having a high damping power.

21. A spindle as set forth in claim 17, wherein said spindle shaft is rotatably supported by said neck bearing approximately intermediate said ends thereof, said power transmitting means comprises a pulley connected directly to said spindle shaft at said other end thereof and a flat belt for transmitting said power from said source of power to said pulley, and said buffer comprises an elastic body having one or more small empty spaces which are radially spaced apart from one another, and which are filled with oil.

22. A spindle as set forth in claim 15, wherein said rotor is a spinning bobbin which is rotatably connected to said one end of said spindle shaft.

23. A spindle as set forth in claim 22, wherein said spindle shaft is rotatably supported by said neck bearing approximately intermediate said ends thereof, said power transmitting means comprises a pulley provided at said other end of said spindle shaft for transmitting said power from said source of power to said spindle shaft through said friction gearing and a flat belt for transmitting said power from said source of power to said pulley, and said buffer comprises an elastic body having one or more small empty spaces which are radially spaced apart from one another, and which are filled with oil.

24. A spindle as set forth in claim 22, wherein said spindle shaft is rotatably supported by said neck bearing approximately intermediate said ends thereof, said power transmitting means comprises a pulley provided between said buffer and said end bearing for transmitting said power from said source of power to said spindle shaft through said friction gearing and a flat belt for transmitting said power from said source of power to said pulley, and said buffer comprises an elastic body having one or more small empty spaces which are radially spaced apart from one another, and which are filled with oil.

25. A spindle as set forth in claim 22, wherein said spindle shaft is rotatably supported by said neck bearing approximately intermediate said ends thereof, said source of power is a motor, said power transmitting means is a rotary shaft embedded in, or connected directly to, said motor, said power being transmitted from said motor to said spindle shaft through said rotary shaft and said friction gearing, and said buffer comprises an elastic body having one or more small empty spaces which are radially spaced apart from one another, and which are filled with oil.

26. A spindle as set forth in claim 16, wherein said rotor is a spinning bobbin which is rotatably connected to said one end of said spindle shaft.

27. A spindle as set forth in claim 26, wherein said spindle shaft is rotatably supported by said neck bearing approximately intermediate said ends thereof, said power transmitting means comprises a pulley provided at said other end of said spindle shaft for transmitting said power from said source of power to said spindle shaft through said friction gearing and a flat belt for transmitting said power from said source of power to said pulley, and said buffer comprises an elastic body having one or more small empty spaces which are radially spaced apart from one another, and which are filled with oil.

28. A spindle as set forth in claim 26, wherein said spindle shaft is rotatably supported by said neck bearing approximately intermediate said ends thereof, said power transmitting means comprises a pulley provided between said buffer and said end bearing for transmitting said power from said source of power to said spindle shaft through said friction gearing and a flat belt for transmitting said power from said source of power to said pulley, and said buffer comprises an elastic body having one or more small empty spaces which are radially spaced apart from one another, and which are filled with oil.

29. A spindle as set forth in claim 26, wherein said spindle shaft is rotatably supported by said neck bearing approximately intermediate said ends thereof, said source of power is a motor, said power transmitting means is a rotary shaft embedded in, or connected directly to, said motor, said power being transmitted from said motor to said spindle shaft through said rotary shaft and said friction gearing, said buffer comprises an elastic body having one or more small empty spaces which are radially spaced apart from one another, and which are filled with oil.

30. A spindle as set forth in claim 1, wherein said rotor is a bell-shaped spraying head into which a paint nozzle is connected, said buffer comprises an elastic body having one or more small empty spaces which are radially spaced apart from one another, and which are filled with oil, and said power transmitting means is a turbine connected directly to said other end of said spindle shaft and adapted for rotation by the air which is supplied by a compressor defining said source of power.

31. A spindle as set forth in claim 15, wherein said rotor is a milling cutter in a milling machine, said power transmitting means comprises a pulley provided between said buffer and said end bearing for transmitting said power from said source of power to said spindle shaft through said friction gearing and a flat belt for transmitting said power from said source of power to said pulley, and said buffer comprises an elastic body having one or more small empty spaces which are radially spaced apart from one another, and which are filled with oil.

* * * * *